Feb. 26, 1957     H. GORDON     2,782,494
METHOD OF MAKING AN ANTI-SKID AND TRACTION CHAIN
Filed May 21, 1953
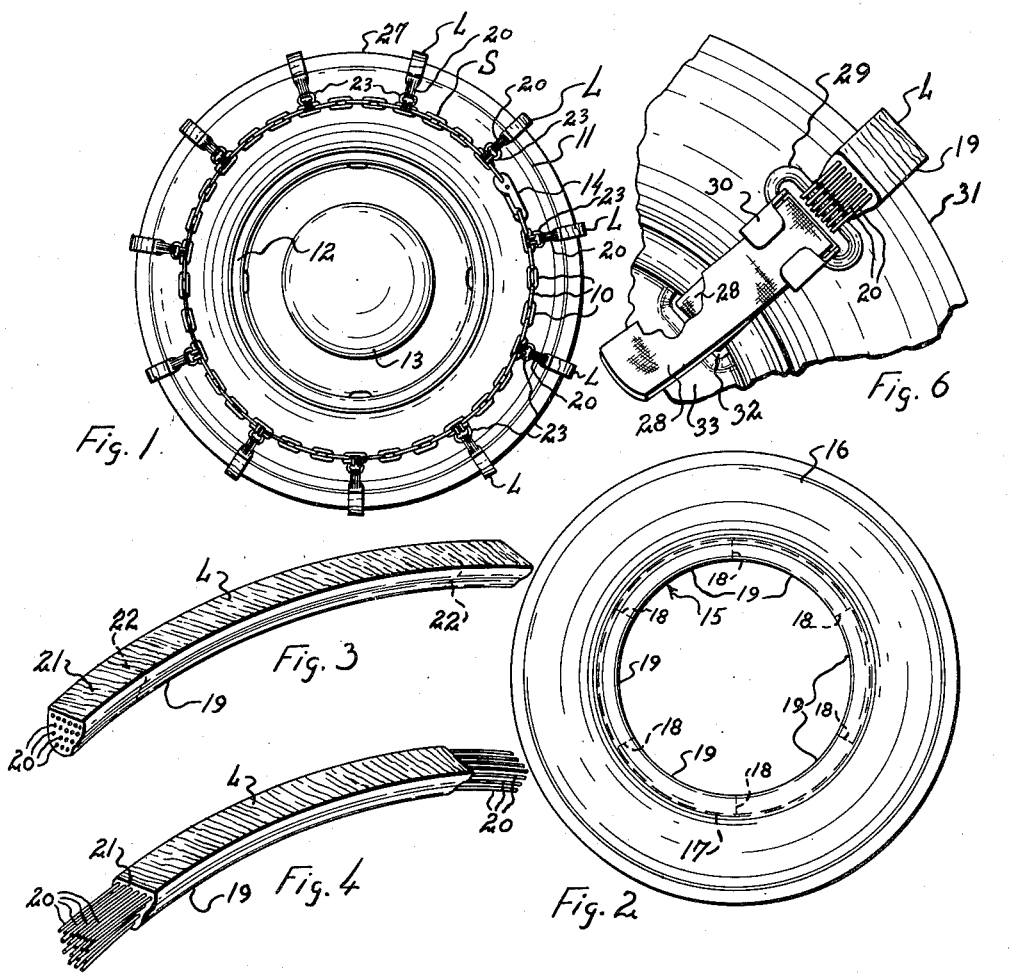
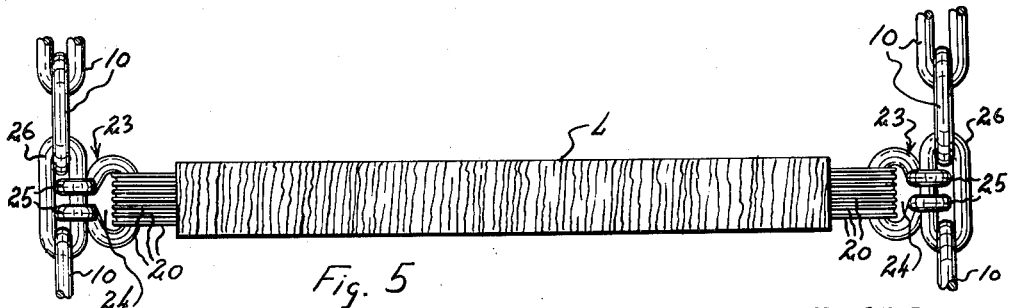
INVENTOR
HARRY GORDON
BY Williamson, Williamson
Schroeder & Adams
ATTORNEYS United States Patent Office 2,782,494
Patented Feb. 26, 1957

2,782,494

METHOD OF MAKING AN ANTI-SKID AND TRACTION CHAIN

Harry Gordon, Duluth, Minn.

Application May 21, 1953, Serial No. 356,352

2 Claims. (Cl. 29—403)

This invention relates to a method of making anti-skid and traction chains for automobile tires and more particularly to a type of tire chain and method of construction in which portions thereof are made in a specific form from discarded and worn auto tires.

It is an important object of the invention to provide for a novel method of making an auto tire chain in which the cross links are constructed of naturally curved rubber strips having a plurality of embedded wires, the links being cut in arcuate sections from the bead portions of an old or worn tire.

It is another object of the invention to provide for a method of constructing a tire chain wherein the cross links are formed from an arcuate section of the bead of a discarded tire, utilizing exposed bead wires for uniting the link to the side members of the traction chain.

It is a further object of the invention to provide a method of making an efficient tire chain which is simple and rugged and which is economical in construction, the portions of the chain which are subject to the greatest wear being manufactured from discarded tire bead sections.

These and other objects and advantages of my invention will more fully appear from the following description made in connection with the accompanying drawings wherein like reference characters refer to similar parts throughout the several views and in which:

Fig. 1 is a side elevation of an automobile wheel and tire upon which my novel tire chain is mounted;

Fig. 2 is a side elevation of a discarded tire casing having a bead with wire reinforcement, the cut lines forming the arcuate sections being indicated by dotted line;

Fig. 3 is an enlarged perspective view of an arcuate bead section which has been cut from a discarded tire such as shown in Fig. 2;

Fig. 4 is a representation of the section shown in Fig. 3, the wire beads having been exposed by cutting away a portion of the surrounding material;

Fig. 5 is a top elevation of a cross link and its attachment to the side members of the chain, the side members being segmentally shown in spread condition; and Fig. 6 is a segmental view of a portion of the side of an automobile wheel and tire showing an alternate form of my anti-skid and traction device when employed as an individual link member.

Referring now more particularly to the drawing, the anti-skid and traction device is shown in Fig. 1 and constitutes generally a device along the lines of conventional tire chains. Such conventional chains have link-supporting means or side members S which are usually constructed of steel or brass chain 10 and disposed at each side of the tire casing 11 when in use. The tire casing 11 is, in turn, a part of an automobile wheel structure having the usual rim 12 and hub member 13. The other portion of the conventional tire chains includes gripping member or cross links L. The side members S usually have fasteners 14 in the nature of tighteners to secure the cross links L tightly against the tire casing 11.

My invention comprehends a special type of cross link which is constructed from the circular bead portion 15 of an old and worn tire casing 16, as shown in Fig. 2. The bead portion of a conventional tire casing 16 comprises the usual rubber and cloth material into which a multiplicity of wires have been imbedded to add strength and to prevent stretching and displacement of the casing when it is secured upon the rim of an automobile wheel under inflated conditions. The bead portion 15 is the rim-gripping portion of the tire and there are two of these beaded portions disposed oppositely in each of the discarded tire casings 16.

In my method of constructing the anti-skid and traction device of the present invention, I cut arcuately along the dotted line 17 of Fig. 2 so as to completely separate the circular bead 15 from the old casing 16. I then cut transversely of the circular bead 15 at spaced points 18 so as to produce a plurality of arcuate segments 19, as shown in detail in Fig. 3. The cut ends of the multiplicity of wires 20 also appear in Fig. 3. The body 21, comprising rubber and cloth reinforcing, surrounds the wires as shown. The wires 20 are constructed of very tough and stiff wire which can be bent without breaking into a variety of configurations.

In order to prepare the arcuate segment 19 for attachment to the link-supporting means S, I cut away the body portion 21 of each of the ends of the segments 19 back to a predetermined position as illustrated by the dotted line 22 adjacent each end. After having so stripped back the body portion from the arcuate segment 19, the wire ends 20 are left exposed as shown in Fig. 4. A typical example of the mounting of the segments as prepared in Fig. 4 is shown in Fig. 5. The side links 10 of the link-supporting means may be supplied with connectors 23, the connectors in the instant case being formed of U-shaped elements having a looped portion 24 and hooked ends 25 which are adapted to cooperate with predetermined chain elements 26. Since each of the arcuate segments have a pronounced curvature, they are disposed along the link-supporting means in spaced relation with the general curvature of all the links L being oriented in the same direction. The links L, of course, have some resiliency so that the difference in the natural curvature of the link and the actual curvature of the tread surface 27 of the casing 11, as shown in Fig. 1, will be conformed to when the anti-skid and traction device is tightly mounted upon the tire. The wire ends 20 may be looped through a closed portion 24 of the connectors 23 and the reversely bent ends can then be welded or otherwise fastened against themselves as shown in Fig. 5. It is, of course, within the contemplation of the invention to utilize any other convenient means of fastening the wire ends 20 to the link-supporting means 10, it being possible to fasten them directly without the use of a separate connector 23 or by supplying a gripping action instead of welding as shown.

An alternate form of the invention is shown in Fig. 6 in which a strap element 28 provides individual link-supporting means and is provided at opposed ends with connector means 29 for cooperating with the exposed ends 20 of the link element L formed of an arcuate bead segment 19 in the same manner as the link of the first mentioned form. A buckle element 30 may be employed to draw up tightly the link L over the tread surface 31, as shown. As in the case of conventional individual tire chains, the strap element 28 may be inserted through an opening 32 provided for such purposes through the rim 33 of an automobile wheel.

It may thus be seen that I have provided a novel means of obtaining special cross links from the circular beaded portion of discarded tire casings, the natural wearing qualities and reinforcing of arcuate segments thereof providing general curvature coupled with traction and anti-skid properties to produce a highly desirable device of that class.

It will, of course, be understood that various changes may be made in the form, details, arrangement and proportion of the parts without departing from the scope of my invention which, generally stated, consists of the matter shown and described herein and set forth in the appended claims.

What I claim is:

1. In the construction of an anti-skid and traction device having aperture link-supporting means adapted to be mounted at the sides of a conventional automobile tire, the method which consists in marginally cutting and severing from a discarded tire casing an arcuate length of beaded edge containing a multiplicity of wire members disposed longitudinally therein, transversely cutting arcuate segments at preselected spaced positions through the length of beaded edge, stripping from each end of each of the arcuate segments the bead material other than the longitudinal wires to expose the end portions of said wires, inserting the exposed wires at each end of an arcuate segment through respective apertures in the link-supporting means while maintaining preselected spaced relation between said segments, and reversely bending and securing the bent ends in place around the link-supporting means.

2. The method set forth in claim 1, including orienting each of the arcuate segments in spaced relation along the apertured link-supporting means with the convex curvature of all of said segments extending outwardly in the same direction and welding the looped ends of said wires in their reversely bent contact against themselves.

References Cited in the file of this patent

UNITED STATES PATENTS

| | | |
|---|---|---|
| 1,859,656 | Cunnington | May 24, 1932 |
| 1,875,081 | McConkey | Aug. 30, 1932 |
| 1,884,283 | Schneider | Oct. 25, 1932 |
| 1,932,576 | Dodge | Oct. 31, 1933 |
| 1,982,403 | Sneed | Nov. 27, 1934 |
| 2,240,982 | Clark | May 6, 1941 |

FOREIGN PATENTS

| | | |
|---|---|---|
| 288,116 | Great Britain | Apr. 5, 1928 |